United States Patent
Drussel et al.

(10) Patent No.: US 7,140,480 B2
(45) Date of Patent: *Nov. 28, 2006

(54) CENTRIFUGAL CLUTCH AND COVER MOUNT ASSEMBLY THEREFOR

(75) Inventors: Douglas W. Drussel, Sedalia, CO (US); George Michael Wilfley, Englewood, CO (US)

(73) Assignee: Drussel Wilfley Design, LLC, Denver, CO (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/863,680

(22) Filed: Jun. 8, 2004

(65) Prior Publication Data

US 2004/0238315 A1 Dec. 2, 2004

Related U.S. Application Data

(63) Continuation-in-part of application No. 10/791,949, filed on Mar. 2, 2004, and a continuation-in-part of application No. 10/327,160, filed on Dec. 20, 2002, and a continuation-in-part of application No. 09/877,518, filed on Jun. 7, 2001, now Pat. No. 6,705,446.

(51) Int. Cl.
*B62M 9/00* (2006.01)

(52) U.S. Cl. .................................... 192/83; 192/105 B

(58) Field of Classification Search ............. 192/83, 192/96, 103 A, 105 B, 105 C; 180/230
See application file for complete search history.

(56) References Cited

U.S. PATENT DOCUMENTS

| | | |
|---|---|---|
| 1,743,170 A | 1/1930 | Vail |
| 2,717,674 A | 9/1955 | Chrichton, Jr. |
| 3,001,623 A | 9/1961 | Fawick |
| 3,003,608 A | 10/1961 | Biraben |
| 3,215,234 A | 11/1965 | Hirano |
| 3,265,172 A | 8/1966 | Atsumi et al. |
| 3,724,622 A | 4/1973 | Barbulesco et al. |
| 3,842,954 A | 10/1974 | Honemann |
| 4,518,070 A | 5/1985 | Ooka |
| 4,576,269 A | 3/1986 | Hamane et al. |
| 4,592,458 A | 6/1986 | Matsuki et al. |
| 4,645,049 A | 2/1987 | Matsuda et al. |
| 4,664,242 A | 5/1987 | Downs |
| 4,986,403 A | 1/1991 | Tipton |
| 5,033,598 A | 7/1991 | Tipton |
| 5,361,882 A | 11/1994 | Tipton |
| 5,392,889 A | 2/1995 | Koitabashi |

(Continued)

FOREIGN PATENT DOCUMENTS

JP 59159434 A2 9/1984

(Continued)

*Primary Examiner*—Saul Rodriguez
(74) *Attorney, Agent, or Firm*—John E. Reilly

(57) ABSTRACT

A clutch having a plurality of cam members between a cover and pressure plate to move outwardly under centrifugal force and cause the pressure plate to move axially to force a plurality of clutch plates into clutching engagement, a manual override mechanism to lock out the pressure plate to maintain the clutch plates in a disengaged position, and pressure limiting springs prevent shock loads from being imparted to the clutch plates when the plates are advanced into clutching engagement with one another. The clutch housing includes a cover which can be mounted either flush or inset in circumferentially spaced walls of the housing and held in place by a retaining ring inserted into slots in the side walls and is adaptable for use with any type of clutch with or without the manual override mechanism and pressure limiting springs.

12 Claims, 12 Drawing Sheets

U.S. PATENT DOCUMENTS

| | | |
|---|---|---|
| 5,423,406 A | 6/1995 | Antonny |
| 5,441,137 A | 8/1995 | Organek et al. |
| 5,642,795 A | 7/1997 | Miura et al. |
| 5,669,480 A | 9/1997 | Kooy et al. |
| 5,733,217 A | 3/1998 | Naraki et al. |
| 6,315,096 B1 | 11/2001 | Dairokuno et al. |
| 6,523,657 B1 | 2/2003 | Kundermann et al. |
| 6,533,056 B1 | 3/2003 | Maimone |
| 6,957,730 B1 * | 10/2005 | Youngwerth ............ 192/83 |

FOREIGN PATENT DOCUMENTS

JP 03069826 3/1991

* cited by examiner

CENTRIFUGAL CLUTCH AND COVER MOUNT ASSEMBLY THEREFOR

CROSS-REFERENCE TO RELATED APPLICATION

This application is a continuation-in-part of patent applications Ser. No. 09/877,518, filed 7 Jun. 2001 now U.S. Pat. No. 6,705,446 for AUTOMATIC CLUTCH WITH MANUAL OVERRIDE CONTROL MECHANISM by Douglas W. Drussel and George Michael Wilfley, Ser. No. 10/327,160, filed 20 Dec. 2002 for MULTI-ROW CAM-ACTUATED CENTRIFUGAL CLUTCH by Douglas W. Drussel and George Michael Wilfley and assigned to the assignee of this invention, and Ser. No. 10/791,949, filed 2 Mar. 2004 for MANUAL/AUTOMATIC PRESSURE CONTROL MECHANISM FOR CENTRIFUGAL CLUTCH, by Douglas W. Drussel and George Michael Wilfley, and assigned to the assignee of this invention, all incorporated by reference herein.

BACKGROUND AND FIELD OF INVENTION

This invention relates to centrifugal clutches and more particularly relates to novel and improved centrifugal clutches having high density cam members which are urged outwardly under centrifugal force in order to activate the clutching elements.

Centrifugal clutches have been developed for motorcycles utilizing one or two rows of balls or other cam members which would move outwardly in response to rotation of a drive shaft to cause the clutch plates to move into engagement with one another. However, in certain applications it was found that there is insufficient centrifugal force generated to clamp the clutch plates together without substantial slipping or without utilizing a larger size case or cover which exceeds the space allowances within stock engine cases. For example, space is at a particular premium in motorcycle clutches incorporating a manual override mechanism, such as, that set forth and described in copending application for U.S. patent Ser. No. 09/877,518 for AUTOMATIC CLUTCH WITH MANUAL OVERRIDE CONTROL MECHANISM.

Accordingly, there is a need for a cam mechanism for centrifugal clutches which can generate the necessary force to clamp the clutch plates together without substantial slipping or increase in the size of the clutch case or cover. At the same time it is desirable to provide a cam-actuating mechanism which requires a minimum of manual pressure to engage or disengage the clutch elements with a manual override mechanism while at the same time being highly sensitive to acceleration in speed to effect engagement of the clutch elements. Still further, a controlled amount of slippage may be built into the hub drive for the clutch in order to prevent damage to the drive train resulting from the application of shock loads.

It has been the practice in motorcycle clutch casings or housings to utilize a generally basket-like housing having circumferentially spaced side walls and to secure the cover by threaded fasteners to the free ends of the side walls and which tends to weaken the connection at the connecting or fastening points between the cover and ends of the side walls, and requires that the cover be mounted on or externally of the housing side walls. Accordingly, there is a need for an improved method of attachment between the cover and side walls but which will distribute the connecting points over a wide area between the cover and side walls, avoid time-consuming attachment of individual fasteners and enable mounting of the cover flush or inset with respect to the housing side walls so as to result in a more compact assembly.

SUMMARY OF THE INVENTION

It is therefore an object of the present invention to provide for a novel and improved clutch housing and cover assembly specifically adaptable for use in motorcycles.

It is another object of the present invention to provide for a clutch housing and cover assembly which is compact, able to withstand high pressures and is easy to assemble.

It is yet another object to provide for a novel and improved cam-actuating mechanism for an automatic clutch which is capable of achieving clutch engagement at lower rpms while generating the necessary clamping force and avoiding slipping of the clutch plates in a simplified, efficient manner.

It is a further object of the present invention to provide in a centrifugal clutch, including those having internal manual override mechanisms, for an extremely compact cam mechanism which is capable of generating sufficient centrifugal force to clamp the clutch plates together without substantial slipping and within the same size case or cover as employed in stock or standard motorcycles.

A further object of the present invention is to provide for a novel and improved manual disengagement mechanism to prevent clutch engagement at higher operating speeds as well as to limit the maximum pressure to which the clutch members can be subjected without expanding the size of clutch housing.

It is a still further object of the present invention to provide for a cover mount assembly in which the cover can be flush or inset mounted with respect to the side walls of the housing in a novel and highly efficient manner.

An additional object of the present invention is to provide in an automatic clutch for controlled slippage to prevent shock loads from being imparted through the drive train of a motorcycle.

In accordance with the present invention, a centrifugal clutch has a plurality of cam members interposed between a cover and pressure plate wherein the cam members are movable outwardly under centrifugal force to cause the pressure plate to move in a direction forcing the clutch members into clutching engagement, and in certain applications a manual override mechanism is utilized to lock out the pressure plate to maintain the clutch members in a disengaged position notwithstanding the speed of rotation of the clutch; and when a manual override mechanism is not employed or, if employed, it is not in the lockout position, pressure limiting means between the cover and pressure plate are operative to prevent shock loads from being imparted to the clutch members when the clutch members are advanced into clutching engagement with one another.

In motorcycle applications where space is at a premium, another feature is to employ a cover which can be mounted either flush or inset with respect to circumferentially spaced side walls of a basket-type housing and be securely anchored by a retaining ring inserted into aligned, circumferentially extending slots along the inner surfaces of the side walls thereby resulting in a compact, high strength assembly.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF ONE FORM OF INVENTION

Figure 1:
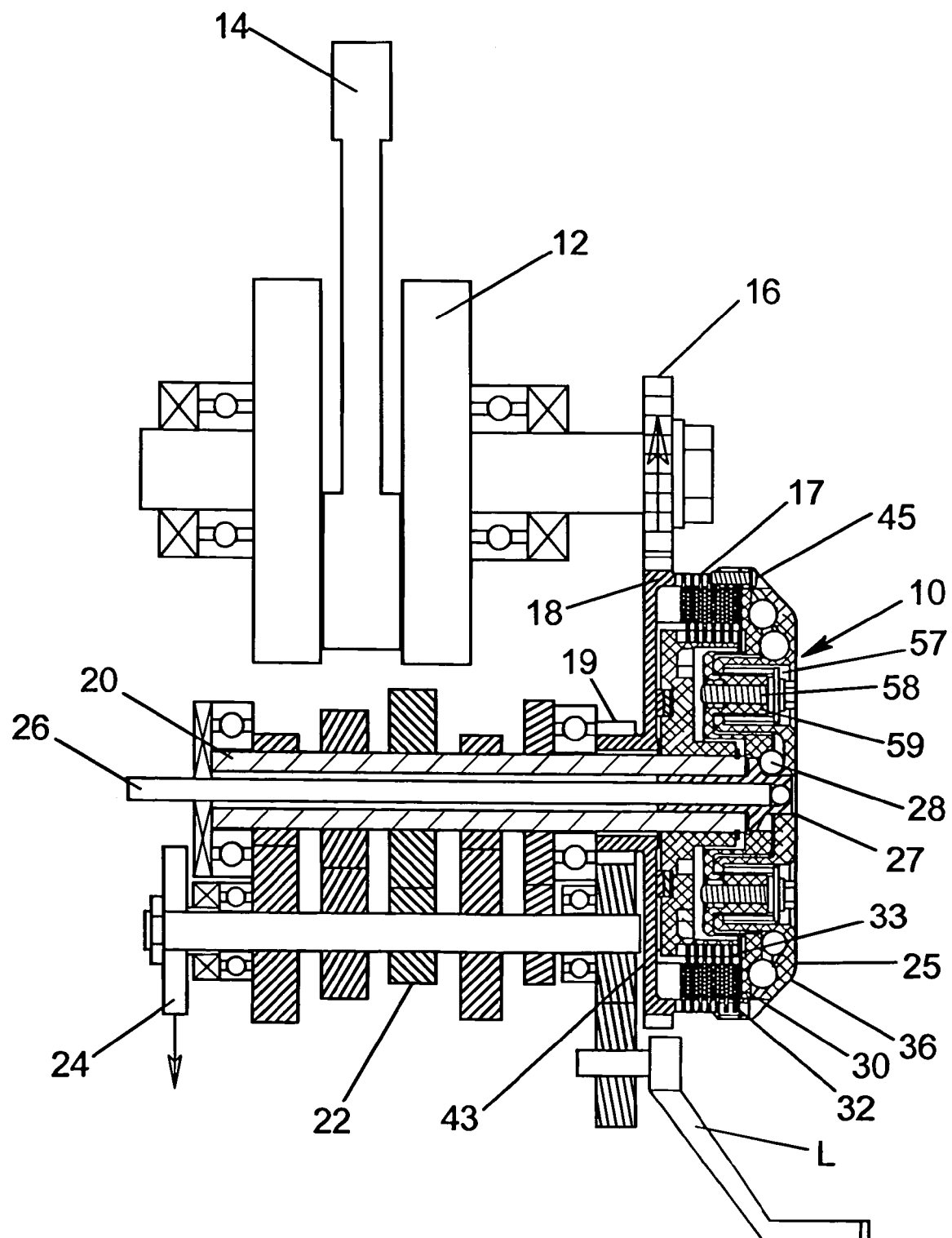
FIG. 1 is a view partially in section of an automatic clutch for a motorcycle having a manual override and incorporating multiple rows of cam members in accordance with the present invention.

Referring to the drawings, FIG. 1 schematically illustrates the mounting of one form of automatic clutch 10 in the drive train of an off-road motorcycle wherein a crankshaft set 12 from an engine piston 14 imparts rotation to a power input side of the clutch 10 through a pinion 16 into a primary drive gear 18 at one end of a clutch housing or basket 17. A transmission shaft 20 is mounted for rotation by the clutch 10 when in the engaged position and, through speed reduction gears represented at 22 rotates a drive sprocket 24 of a belt or chain drive, not shown, into the rear wheel of the motorcycle. In a manner shown and described in more detail in copending application for patent Ser. No. 09/277,518, a push rod 26 extends through the transmission shaft 20 and is manually controlled by a hand lever, not shown, on the motorcycle to advance a slide member 27 forwardly and force a series of balls 28 in a radial outward direction against a pressure plate 30. Outward radial movement of the balls 28 against the pressure plate 30 will displace the pressure plate 30 away from the cover 25 and force a series of radially inner clutch plates 32 to move into positive engagement with radially outer clutch plates 34. Again, although not shown, a linkage at the end of the push rod opposite to the cover 25 is connected to a cable control wire which can be manually controlled by a hand lever on the handlebar of the motorcycle to advance and retract the push rod 26 with respect to the clutch assembly 10.

The automatic clutch 10 also incorporates a novel cam-actuating mechanism generally designated at 36 and comprising multiple staggered rows of cam members 38, 39 and 40, to be hereinafter described in reference to FIGS. 4 to 11, which will move outwardly under centrifugal force between the cover 25 and pressure plate 30 to force the clutch plates 34 into positive engagement with the plates 32. The inner clutch plates 32 have tabs 33 which are axially slidable in grooves in the outer wall of hub 43, and the transmission shaft 20 is mounted for rotation of the hub 43. The radially outer clutch plates 34 have extension tabs 35 which are slidable axially along circumferentially spaced axial grooves on the inner wall of a cylindrical basket or housing 17. A basket 17 is secured along its outer peripheral edge to the outer peripheral edge of the cover 25 by suitable fasteners, such as, screws 45. The clutch plates 32 and 34 are sandwiched between the pressure plate 30 and the gear 18 at the end of the basket 17, and the pressure plate 30 is normally held away from the clutch plates 32, 34 by a series of compression springs 59 mounted on bolts 58 between the cover 25 and recessed portions 57 in the pressure plate 30. The spring tension of the springs 59 is regulated to resist radial outward movement of the balls 38, 39 and 40 as well as movement of the pressure plate 30 against the plates 32, 34 until the clutch 10 reaches a predetermined rotational speed imparted by the crankshaft 12 through the gear 18, for example, when the engine has been started by the kickstart lever L. The construction and arrangement of the clutch plates 32 and 34 as well as the kickstart lever L is standard.

Detailed Description of Second Form of Invention

FIGS. 2 to 11 illustrate another form of clutch 10' in which like parts to those of FIG. 1 are correspondingly enumerated. More specifically, in FIGS. 2 and 3, the manual override mechanism in FIG. 1 consisting of the push rod 26, slide 27 and cams 28 has been removed. Instead, the clutch is actuated only by the cam-actuating mechanism 36 which is broadly comprised of radially inner and outer rows of circumferentially spaced cam members or balls 38, 39 and 40 interposed between a pressure plate 30 and a cover 25. The balls 38 to 40 are responsive to centrifugal force to roll outwardly along radial pockets or cam faces 48, 52 and 56 in the pressure plate 30 and aligned pockets or cam faces 46, 50 and 54 in the cover 25 so as to axially displace the outer frictional clutch plates 32 into locking engagement with the inner clutch plates 34.

An important feature of the present invention resides in the radially inner and outer rows of cam members or balls 38, 39 and 40. Preferably, as shown in FIGS. 4 to 11, a series of circumferentially spaced cam faces 46 are arranged in a radially outer row of the cover 25 and are disposed in facing relation to a corresponding row of cam faces 48 on the pressure plate 30. The balls 40 are disposed between each of the confronting cam faces 46 and 48 and are disposed in uniformly spaced relation to one another.

An inner row of cam faces 50 is arranged on the cover 25 in inner concentric relation to the outer row between alternate adjacent pairs of cam faces 46 in the outer row. The cam faces 50 are disposed in aligned, facing relation to correspondingly spaced cam faces 52 on the pressure plate 30, and the balls 39 are disposed for radial sliding movement between the cam faces 50 and 52.

A third row of cam faces 54 extends between alternate cam faces 50 on the cover 25 and are disposed radially inwardly but partially between alternate adjacent pairs of the cam faces 46. The cam faces 54 are disposed in aligned facing relation to correspondingly sized cam faces 56 in the pressure plate 30 and are adapted to receive the ball members 38. The cam faces 54, 56 define a somewhat staggered concentric row with respect to the inner concentric row of cam faces 50, 52 by virtue of being somewhat smaller in size to receive the smaller balls 38. Accordingly, the cam faces 54, 56 are free to extend radially outwardly between the cam faces 46, 48 a slightly greater distance than the larger cam faces 50, 52.

Preferably, each of the outer cam faces 46 is formed along an angled surface 44 of approximately 30° to 50° adjacent to the outer periphery of the cover 25 and are of generally concave, oval-shaped configuration so as to be elongated in the radial direction. The cam faces 46 are dimensioned to be of a length to permit rolling movement of a ball between the radial inner and outer positions illustrated in FIG. 6 in response to centrifugal force. The same balls 40 are free to slide or roll in an outward radial direction along the outer concentric, confronting cam faces 48 in the pressure plate 30; however, the cam faces 48 are shallower than the cam faces 46 and flatten out from an inner radial curved configuration along the rolling surface portion of the face. The cam faces 48 each terminate in the flattened surface portions so as to be relatively open-ended as best seen from FIG. 9 at the outer peripheral edge of the cover 30. The inner row of cam faces 50 is situated at the base 51 of the angled portion 44 and each face 50 is of generally concave, oval-shaped configuration and elongated in the radial direction with the contact surfaces of the cam faces 50 angled at approximately 30°–50° toward the pressure plate 30. The balls 39 are free to undergo the same distance of radial sliding or rolling movement as the balls 40. In turn, the cam faces 52 on the pressure plate 30 are of generally concave configuration and elongated in the radial direction but not angled toward the confronting cam faces 50 and have flat surfaces along which the balls 39 are free to roll.

The intermediate or staggered cam faces 54 on the cover 25 are of a configuration corresponding to the inner row 50 but again are shorter only to accommodate the smaller balls 38. Similarly, the cam faces 56 in the pressure plate 30 correspond in configuration to the cam faces 52 but are shallower than the cam faces 52. Referring to the cam-actuating mechanism 36 employed in the preferred and alternate forms of invention of FIGS. 2 to 15, the staggered inner row of balls 38 maximizes the weight of the balls so that axial force generated is maximized at minimum speeds. This creates more axial force at lower speeds to engage the clutch positively at low engine speed. The outer row of balls 40 has the most influence because it is at the largest diameter so that it is fitted with the most balls possible. To get more weight an inner row is added. To maximize the diameter and therefore the centrifugal effect of the inner row, it is nested between the outer row of balls. This means that the inner row must have the same number of balls as the outer row. For the purpose of illustration but not limitation, if there are thirty-six balls 40 of ⅜" diameter in the outer row, the inner row can be made up of thirty-six smaller balls or a combination of small and large balls. It turns out that eighteen balls of ⅜" diameter and eighteen balls of 5/16" diameter will fit in the inner row and nest between the balls in the outer row and provide the maximum mass. The other options such as all 5/16" diameter balls in the inner row or limiting each row to thirty-two balls and use all ⅜" diameter balls all result in less total mass. The cam faces for the balls 38, 39 and 40 are designed to let the balls ride on a radially flat surface on the pressure plate and on a radially uniformly inclined surface on the cover. The pockets for the ⅜" balls and 5/16" balls are different depths so all the balls will be in contact with both the pressure plate and cover at all times.

The relative depths within each component is of no significance. Thus they are all designed to travel the same distance. The cam faces are actually slightly longer than necessary so the balls will never come to the outer ends, but will always be stopped by the axial resistance of the friction disks. The pockets are different lengths only because of the diameter of the cutter used to make them. The straight portion of each pocket (the range where the ball is intended to operate) is the same for all cam faces or pockets since the travel is expected to be the same. The cutter makes a radius beyond this usable length which is equal to the cutter radius so each pocket is the usable length plus twice the radius. Thus the pockets for ⅜" balls are 1/16" longer than the pockets for the 5/16" balls. The shape of the outer end of the pockets doesn't matter, as the balls never get there anyway. The inner end of each pocket is normally rounded so the ball will nest there when the clutch is disengaged, but it could be squared or other shapes to provide a method to simply keep the balls from falling out. In practice, the shapes of the ends of the pockets may vary because of the overall shape of the part and how they blend with other geometry.

Figure 11:
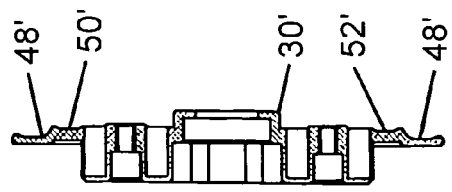
FIG. 11 is a sectional view taken about lines 11—11 of FIG. 10.
Figure 10:
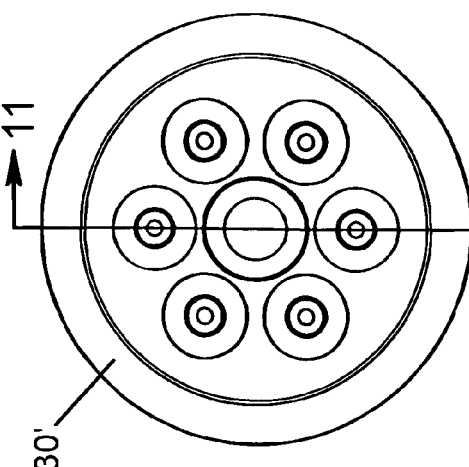
FIG. 10 is a front view in elevation of a modified form of pressure plate without indented cam faces.
Figure 9:
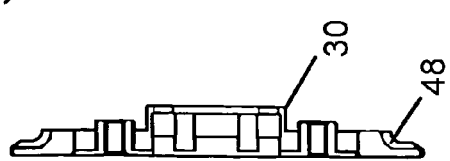
FIG. 9 is a sectional view taken about lines 9—9 of FIG. 8.
Figure 8:
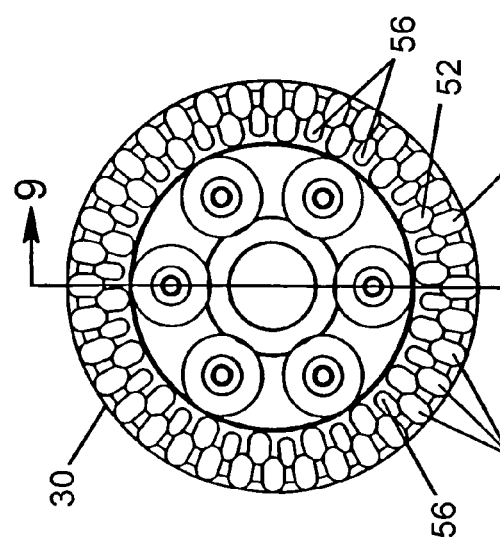
FIG. 8 is a front view in elevation of the internal cam faces on the pressure plate of the preferred form.

Further, in certain applications, it may be desirable to employ a modified form of pressure plate 30' in place of the pressure plate 30, as illustrated in FIGS. 10 and 11. The pressure plate 30' has substantially flat surfaces 48', 50' and 52' along which the balls 38, 39 and 40, respectively, will advance. In this way, the complementary cam faces 46, 50 and 54 on the cover 25 serve as the sole means of spacing and guiding the ball members 38, 39 and 40 radially inwardly and outwardly between the cover 25 and pressure plate 30'. It will be readily apparent that other types of ball races may be employed in place of the pockets or cam faces 46, 50 and 54 in the pressure plate to maintain the desired spacing and alignment of the balls 38 to 40 between the confronting surfaces of the cover 25 and the pressure plate 30 or 30'.

Preferably, the cam members or balls 38 to 40 are composed of a material of high density, such as, tungsten carbide in cooperation with the cam rows as described. In this way, it is possible to make the entire cam-actuating mechanism more compact with smaller-sized balls of higher density being more sensitive to the speed of rotation or centrifugal force so as to displace the clutch plates into positive locking engagement at lower speeds. Use of high density cam members 38 to 40 therefore minimizes the speed necessary to cause the balls to advance the plates into locking engagement as well as to prevent, or at least minimize, any slippage between the clutch plates 32 and 34.

Figure 2:
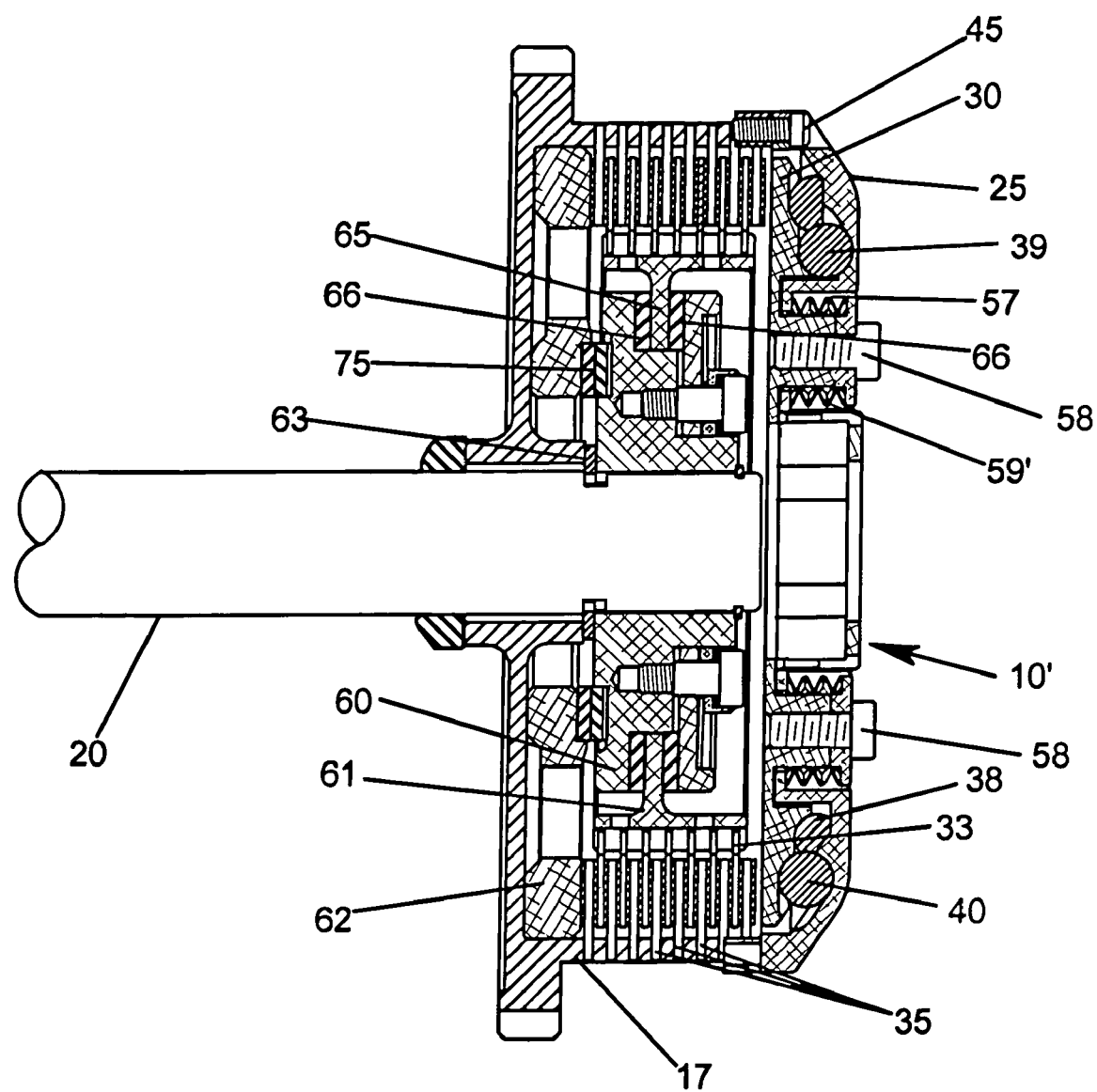
FIG. 2 is an enlarged view partially in section of preferred form of automatic clutch having a torque limiter assembly and multiple rows of cam members shown in the released position.
Figure 3:
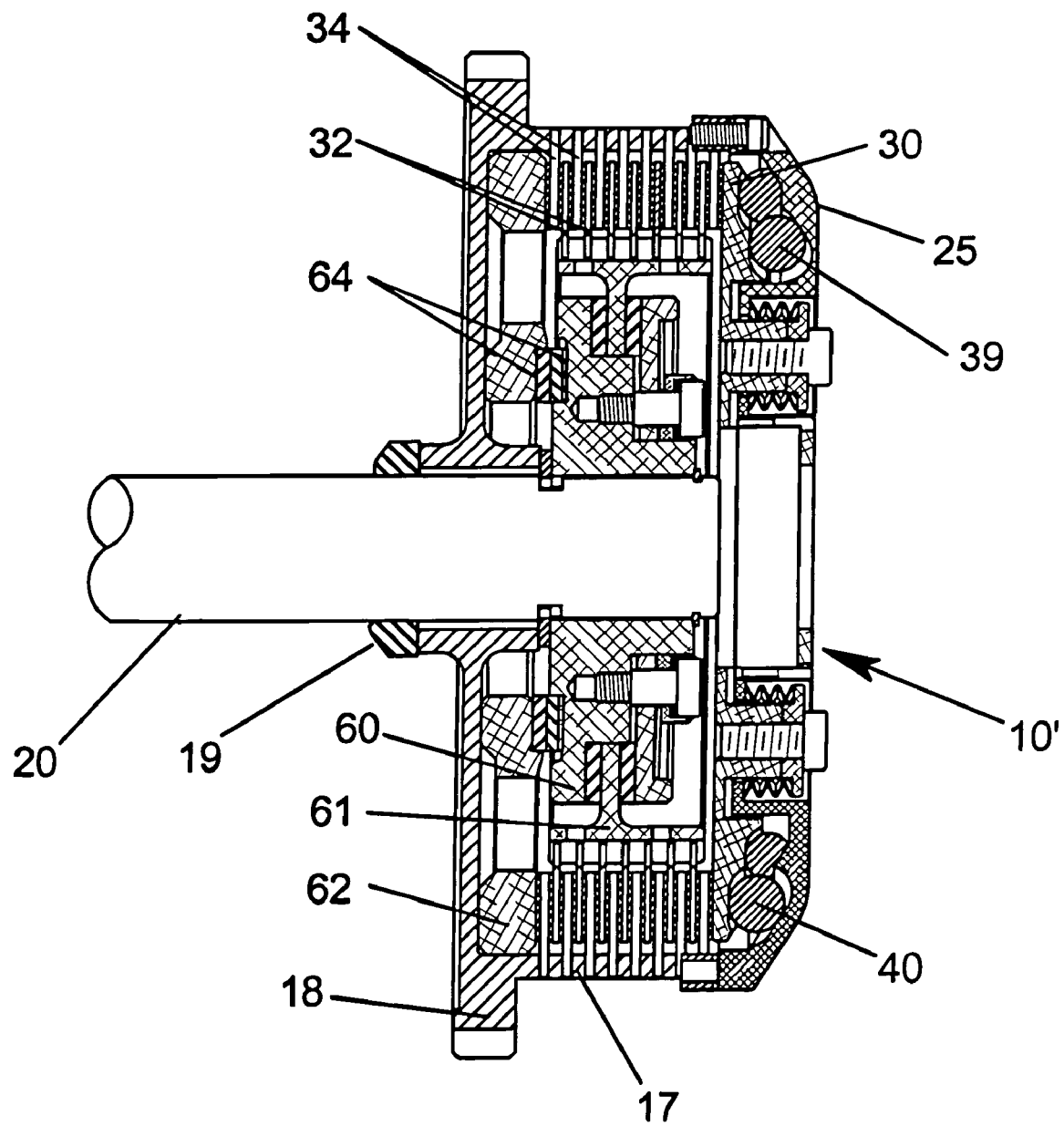
FIG. 3 is a view corresponding to FIG. 2 shown in the engaged position.
Figure 7:
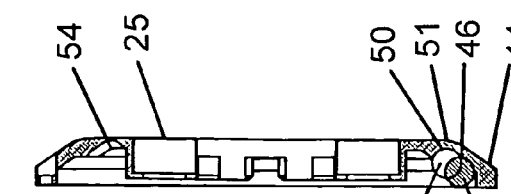
FIG. 7 is a cross-sectional view taken about lines 7—7 of FIG. 6.
Figure 6:
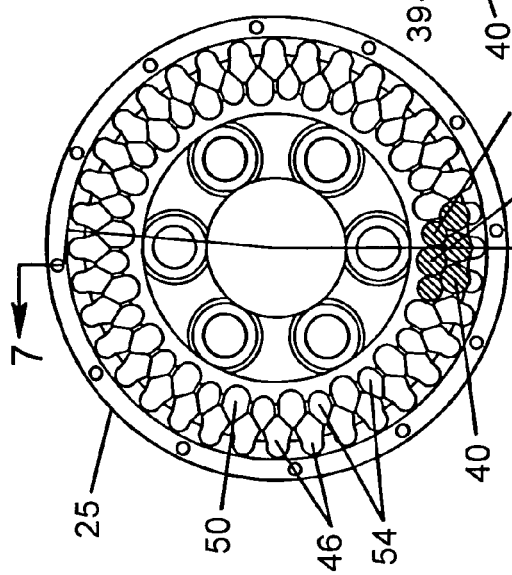
FIG. 6 is a front view in elevation of the cover of the form of clutch shown in FIGS. 2 and 3 and illustrating the staggered relation of a select number of cam members in cam faces on the inner surface of the cover.
Figures 4, 5:
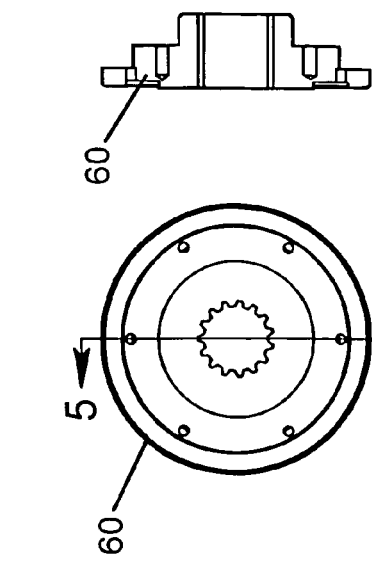
FIG. 4 is a front view of the inner hub of the clutch shown in FIGS. 2 and 3.
FIG. 5 is a cross-sectional view taken about lines 5—5 of FIG. 4 of the inner hub of the preferred form of clutch shown in FIGS. 2 and 3.

Referring in particular to FIGS. 2 and 3, the pressure plate 30 is normally retained against the cover 25 by a series of compression springs 59' mounted on bolts 58 between the cover 25 and recessed portions 57 in the pressure plate 30. Preferably, the springs 59' are WAVE™ springs Model No. CO75-M5 manufactured and sold by Smalley Steel Ring Co. of Lake Zurich, Ill. The springs 59' are pretensioned to resist outward radial movement of the balls 38 to 40 until the engine reaches a predetermined speed thereby causing the clutch plates 32 and 34 to move into locking engagement and impart rotation to the hub 60 and shaft 20.

In certain applications, such as, for example, trail bikes or racing bikes where a limited degree of slippage is needed to absorb shock loads resulting from sudden braking, one or more adjustments may be made including but not limited to reducing the number of balls 38 to 40 in each row, reducing the spring tension of the springs 59', or employing lower density ball members in one or more of the rows 38 to 40.

In accordance with the present invention, another highly effective way to prevent shock loads from being transmitted through the drive train when there is non-slip engagement between the clutch plates 32 to 34 is to employ a torque limiter mechanism T as illustrated in FIGS. 2, 3 and 12 to 15. Thus, in place of the inner hub drive shown in FIG. 1, split inner hub portion 60 and outer hub portion 61 as well as a spacer 62 are positioned in the basket 17; also a thrust washer 63 is mounted on the shaft 20 to separate the end wall of the basket 17 from the inner hub 60. A circular flange 65 on the outer hub portion 61 is sandwiched between a pair of annular friction disks 66 and a cover plate 68. A Belleville spring 69 and retainer 70 are assembled together with the inner hub 60 by a series of screws 72 having suitable shims 74 between the enlarged heads of the screws 72 and spring retainer 70, the Belleville spring 69 acting to pretension the shims 74 and thereby to compress the friction disks 66 into substantially non-slipping engagement with the flange 65.

When the pressure plate 30 is displaced by the balls 38 to 40 to lock the clutch plates 32 and 34 together, the outer hub 61 will operate through the friction disks 66 to drive the inner hub 60 and transmission shaft 20. The friction disks 66 will permit slight or instantaneous slippage so as to absorb any shock loading, for example, when the rear wheel of the motorcycle is off the ground and spinning, then suddenly hits the ground and is stopped while the engine continues to run. Thus, there is just enough slippage between the friction disks 66 and flange 65 to prevent shock loads from being imparted to the drive train via transmission shaft 20 as a result of the non-slip engagement between the clutch plates 32 and 34.

In addition, bearing races 64 are interposed between the spacer 62 and the inner hub 60 to receive a plurality of circumferentially spaced needle bearings 75 to prevent the thrust washer 63 from galling or seizing up under certain conditions of use if there is insufficient lubrication between the thrust washer 63 and spacer 62 when the inner hub 60 is driven by the hub drive 61. The needle bearings 75 also reduce the friction between the spacer 62 and the inner hub 60 when the clutch is not engaged; and reduces any tendency of the clutch to creep when it is not engaged.

Figure 12:
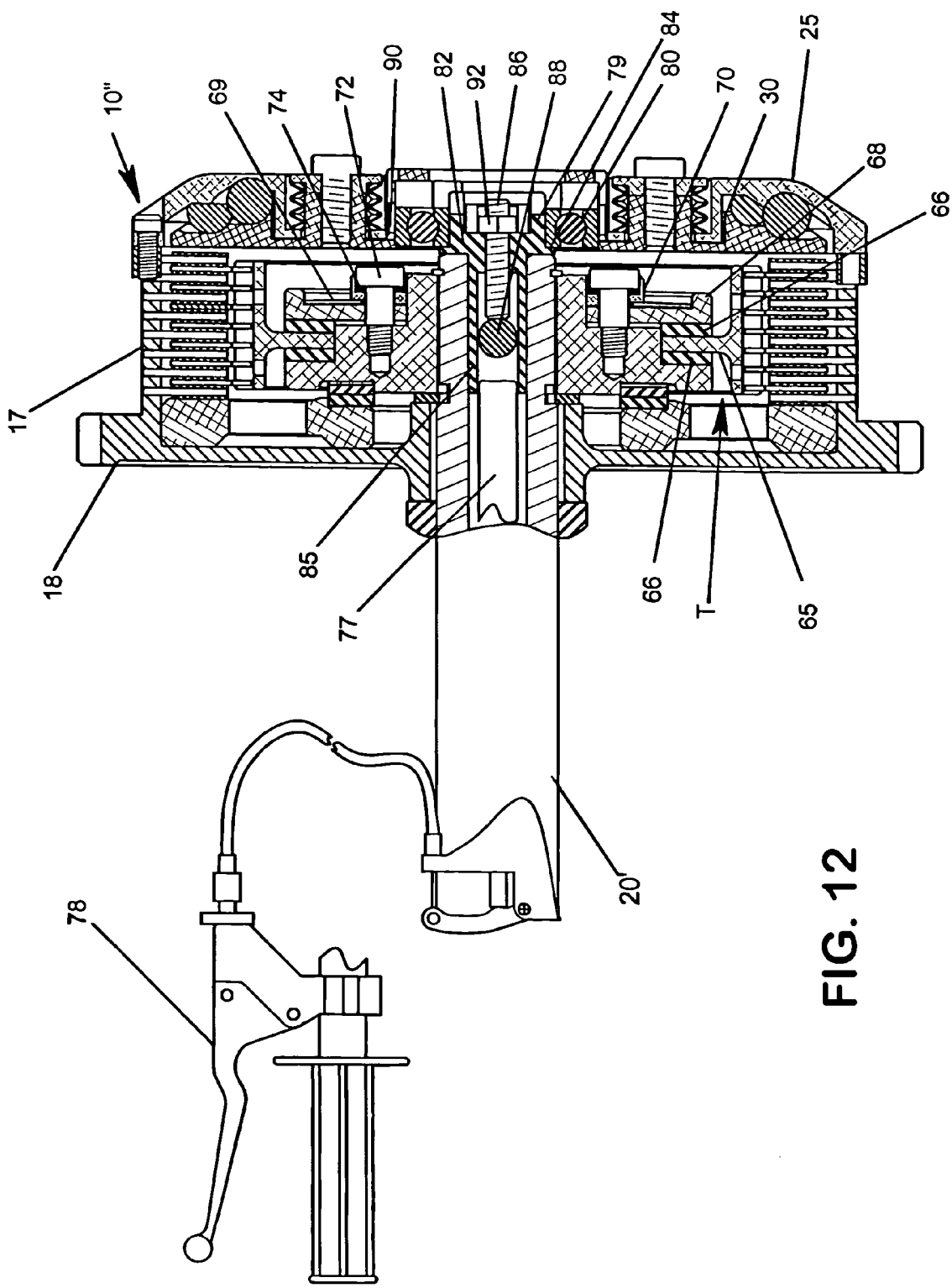
FIG. 12 is a view partially in section of another modified form of automatic clutch incorporating a torque limiter assembly and clutch lockout mechanism shown in the released position in accordance with the present invention.
Figure 13:
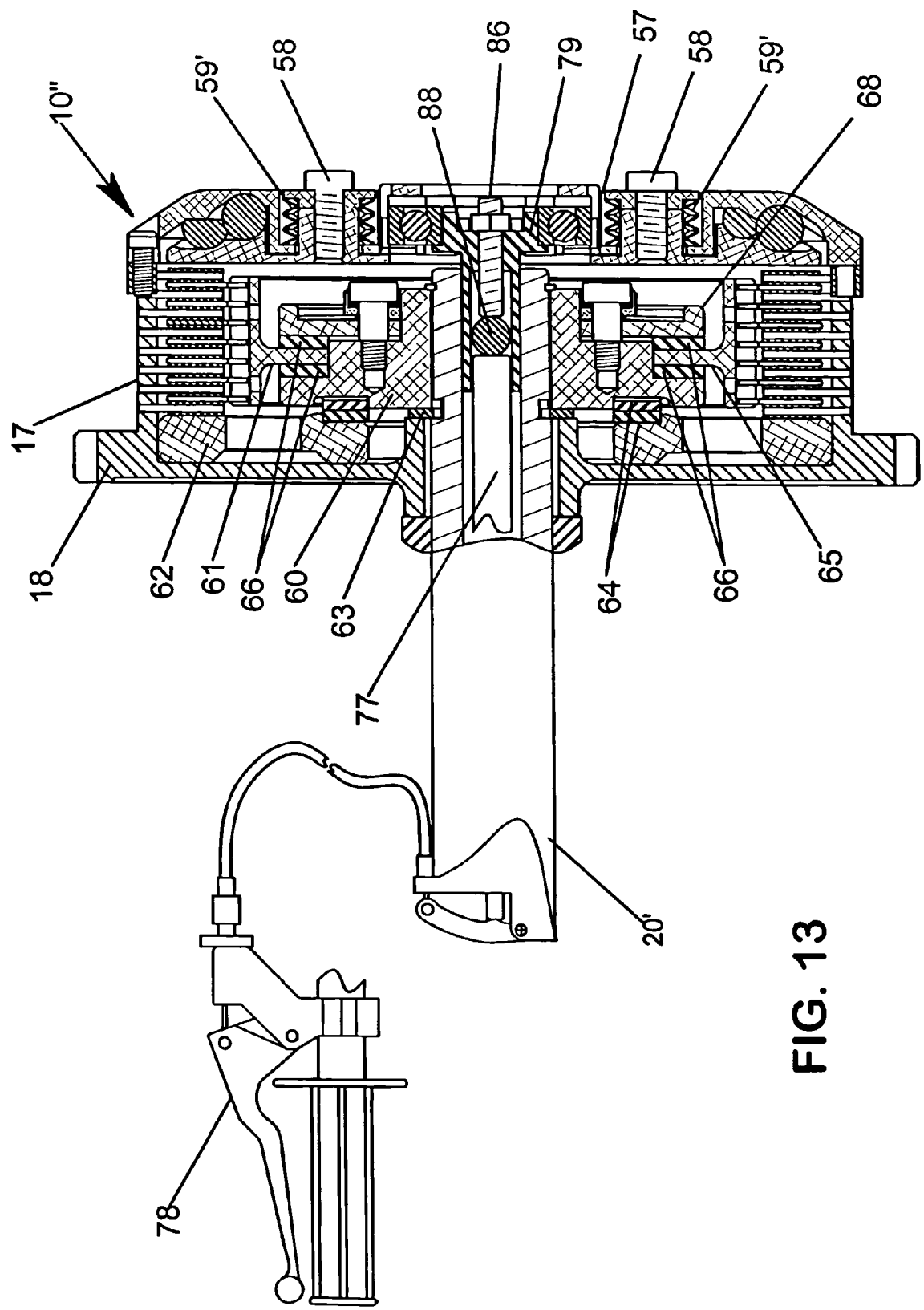
FIG. 13 is a view partially in section of the form of invention of FIG. 12 with lockout mechanism shown in the engaged position.
Figure 14:
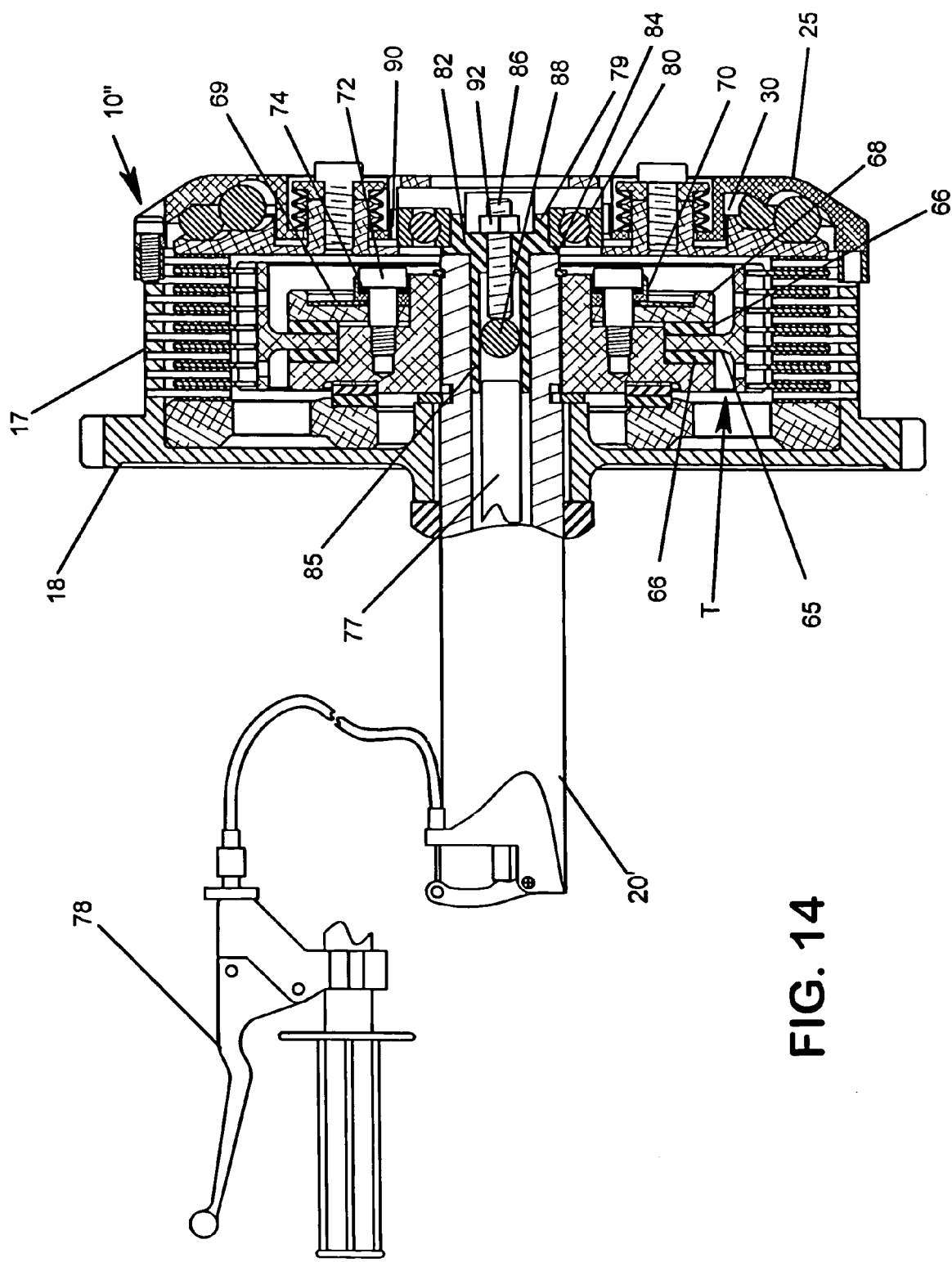
FIG. 14 is another view partially in section of the form of invention shown in FIGS. 12 and 13 with the automatic clutch in the engaged position.

FIGS. 12 to 14 illustrate a motorcycle clutch 10' having a manual override mechanism including a control rod 77 with hand control lever 78, receiver or guide 79 and ball bearing 80. Like parts to those of the preferred form of FIGS. 2 to 11 are correspondingly enumerated. Specifically, this form of invention is an improvement to the modified form of FIGS. 12 and 13 in our copending application for patent Ser. No. 09/877,518. The pressure plate 30 and cover 25 are designed to enable the manual override mechanism to mechanically lock the clutch in a released or neutral position, as shown in FIG. 13, so that the clutch 10" cannot be engaged until the control rod 77 is released by releasing the lever 78 to the position shown in FIG. 14. To this end, the receiver 79 includes a sleeve 85 inserted in the leading end of the transmission shaft 20 and an opposed generally cup-shaped end 82. An external shoulder 84 on the end 82 engages a flat end of the bearing race for the ball bearing 80, the bearing 80 being permanently affixed to an inner peripheral edge 90 of the pressure plate 30.

A threaded stem 86 is adjustably mounted in a threaded bore centrally of the receiver 79 and has a ball bearing 88 at one end of the stem 86 within the sleeve 85. The stem is threadedly adjustable and locked in place by a lock nut 92, according to the length of the control rod 77, so that the receiver 79 will be advanced between the released position shown in FIG. 14 and lockout position shown in FIG. 13. Accordingly, only when the control lever 78 is released, as shown in FIG. 12, will the pressure plate 30 be able to compress the clutch plates 32, 34 under the urging of the ball members 38 to 40 in response to the engine accelerating to a speed sufficient to overcome the force of the springs 59', as shown in FIG. 12. In this way, the automatic clutch 10" can be employed on a motorcycle having an electric starter in place of a stock or manual clutch typically used in such situations. In the same manner as in the form of invention of FIGS. 2 to 11, the modified form of FIGS. 12 to 14 employs the same cam-actuating mechanism 36 so as to be extremely compact with smaller cam members or balls 38, 39 and 40 being highly sensitive to acceleration in speeds and thus the speed necessary to cause the clutch plates 32 and 34 to engage. In addition, minimum manual or hand pressure is required on the hand lever 78 to retain the clutch plates 32 and 34 in the released position.

The foregoing description of the modified form of clutch 10" shown in FIGS. 12 to 14 is given more by way of illustrating the versatility of the forms of automatic clutches described with or without the manual override mechanisms 36 of the type disclosed herein as well as in my hereinbefore referred to copending application for patent Ser. No. 09/877, 518. In general, however, the manual override mechanism 36 is useful in any application where it is desirable to manually release or engage the clutch members 32 and 34 in addition to the automatic clutch, and the pressure required to engage the clutch members can be adjusted by a combination of changes in spring tension of the springs 59' as well as the number and weight of cam members 38 to 40. Thus, the cam-actuating mechanism for the reasons described requires a minimum of manual pressure to engage or disengage the clutch elements with a manual override mechanism as well as being highly sensitive to acceleration in speed to cause the clutch members to engage.

In use, both with reference to FIGS. 1 and 12 to 14, the control rod 26 or 77, respectively, can be manually adjusted to control the degree or amount of pressure between the clutch plates and thus can effectively regulate slipping engagement between the fully engaged and disengaged positions of the clutch plates. For example, when the clutch is at a speed sufficient to cause the clutch plates 32, 33 to move into engagement with one another, manually advancing the control rod 20 or 77 to cause the pressure plate to start to move away from the clutch plates initially will lessen the pressure between the clutch plates. As the pressure on the control rod 20 or 77 is increased, it will further lessen the pressure or clamping force between the clutch plates until finally the clutch plates will become disengaged. In this way, the operator is able to control the degree of slipping engagement between the clutch plates through the hand control lever independently of any spring pressure, for example, exerted by the compression springs 59 of FIG. 1 or the torque limiter T of FIGS. 12 to 14 and offers another dimension to the operator in exerting close control over the speed and performance of the motorcycle.

Detailed Description of Third Form of Invention

Figure 15:
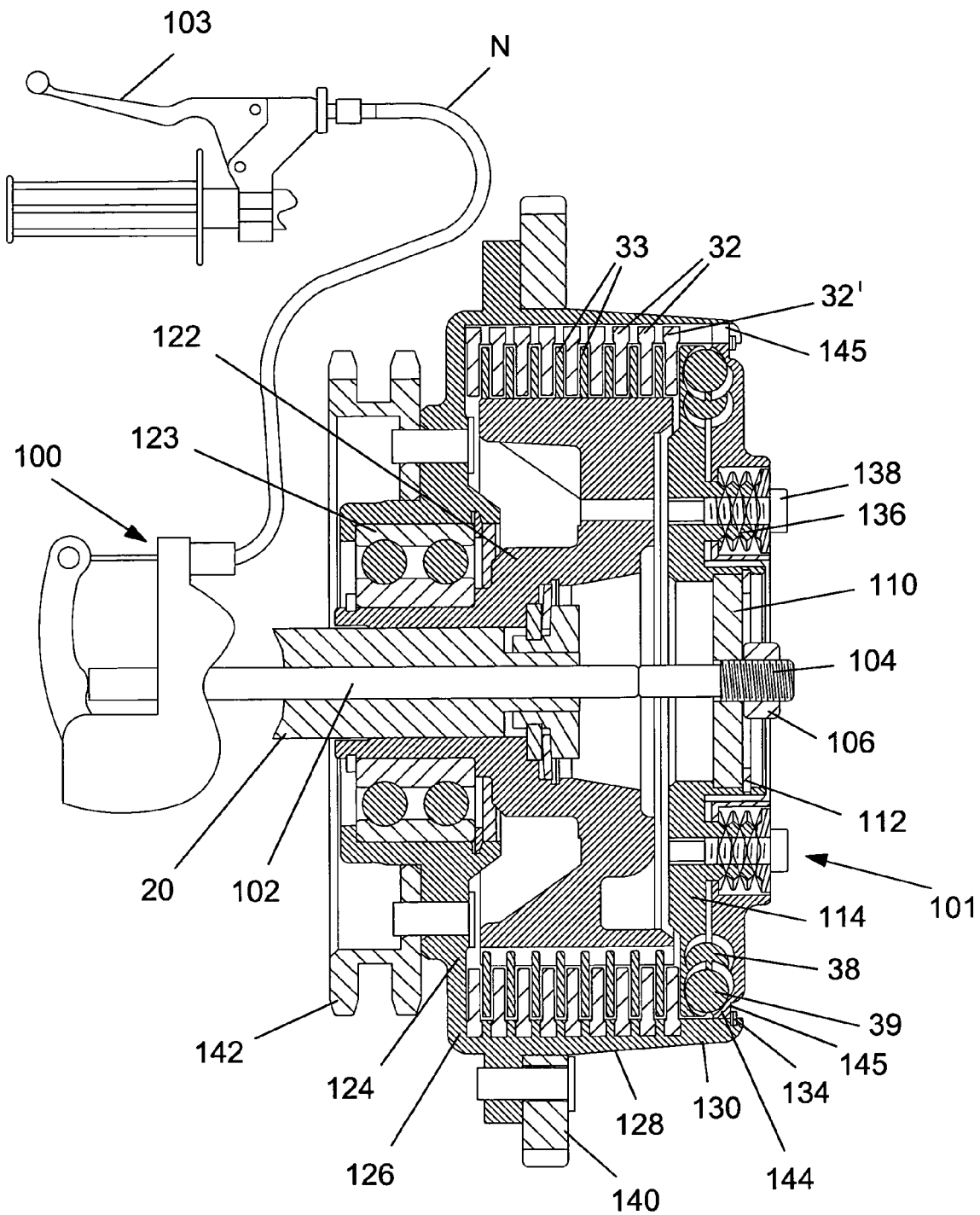
FIG. 15 is a cross-sectional view of another embodiment of the present invention utilizing a snap ring cover mount.

FIGS. 15 to 21 illustrate a third form of invention for a motorcycle clutch 101 and having a manual override mechanism 100 comprised of a control rod 102 with hand control lever 103, cable C and a stem 104. The stem is threadedly adjustable and locked in place by a lock nut 106, according to the length of the control rod 102, so that the receiver 104 can be axially advanced into a lockout position, as shown in FIG. 15, in response to actuation of the control lever 103. Specifically, in the lockout position, the stem 104 will act through the mounting plate 110 which is anchored by a snap ring 112 to the pressure plate 114 to prevent or lock out the clutch plates 32 from engagement with the clutch plates 33. In this respect, the pressure plate 114 is biased away from the clutch plates 32 and 33 by compression springs 136. When the clutch is accelerated up to a predetermined operating speed, a series of inner and outer rows of cam members or balls 38, 39 are urged outwardly under centrifugal force to overcome the urging of the springs 120 and drive the pressure plate 114 into engagement with the endmost plate 32' as well as the other plates 32 which are mounted on the inner wall of a clutch housing 126, unless the control rod 102 has been advanced to the lockout position as described.

Figure 16:
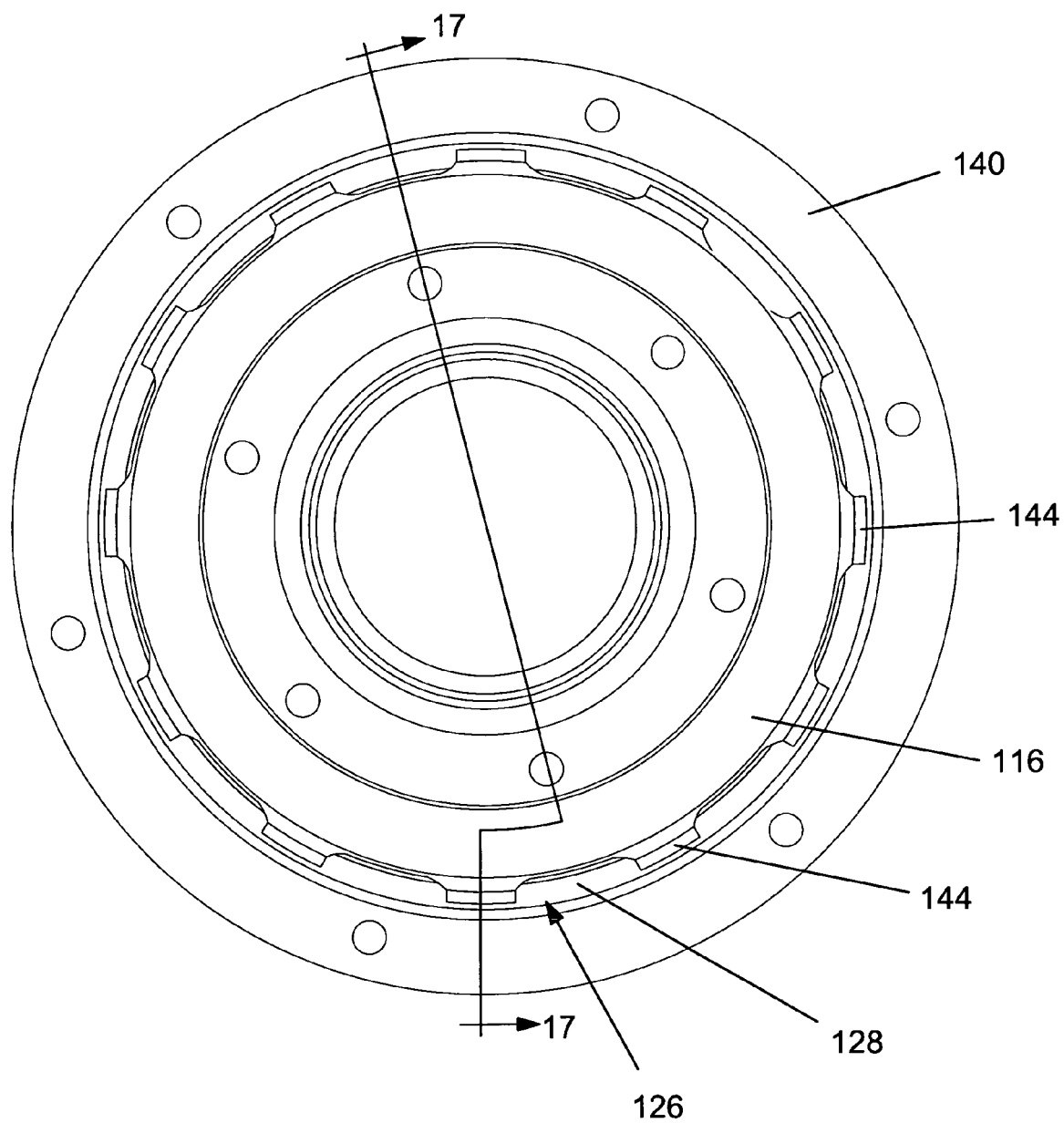
FIG. 16 is an end view of the embodiment shown in FIG. 15.
Figure 17:
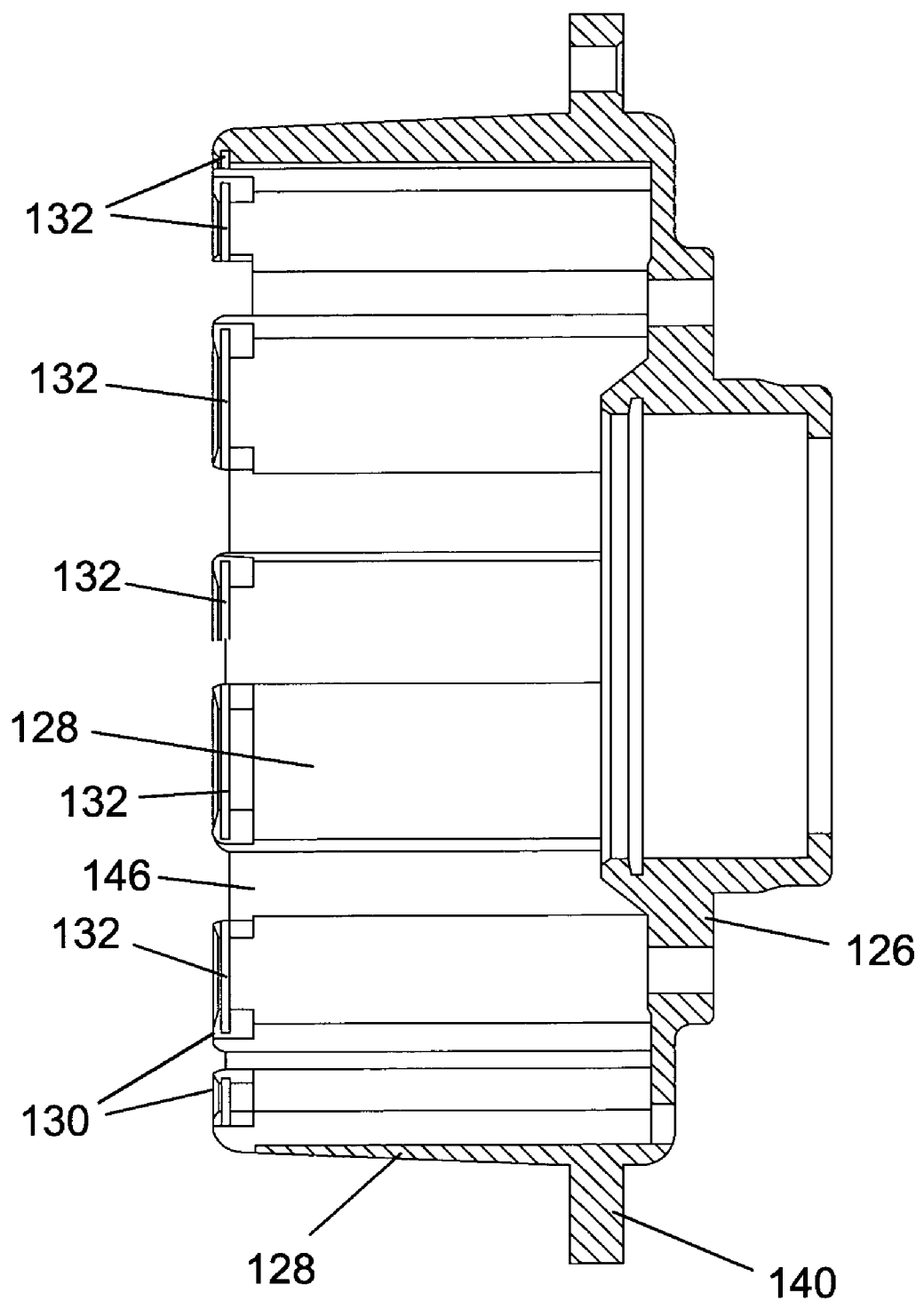
FIG. 17 is a cross-sectional view taken about lines 17—17 of FIG. 16 with the cover removed.
Figure 18:
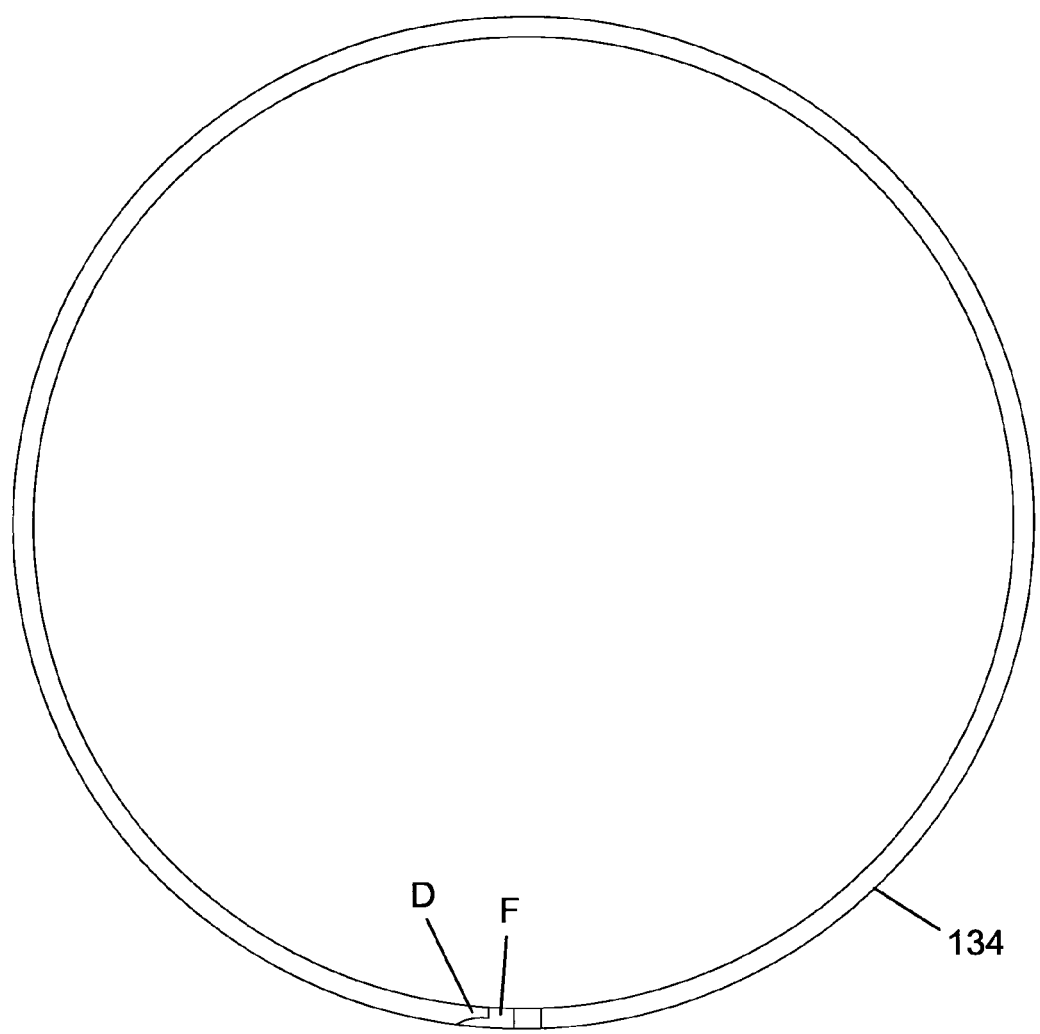
FIG. 18 is a plan view of a snap ring utilized in the embodiment of FIGS. 14 and 15.
Figure 19:
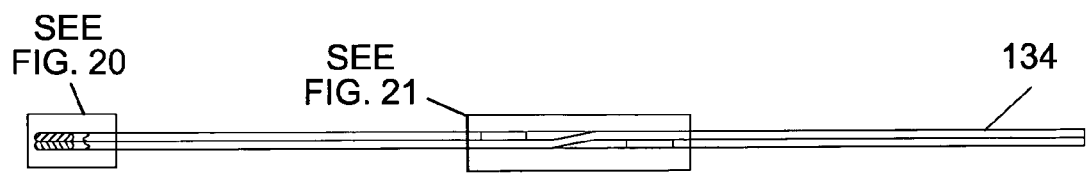
FIG. 19 is a side view of the snap ring illustrated in FIG. 18.
Figure 20:
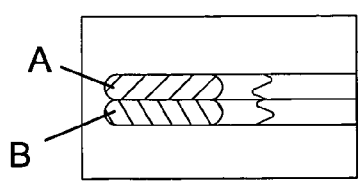
FIG. 20 is an enlarged cross-sectional view of the snap ring illustrated in FIG. 19.
Figure 21:
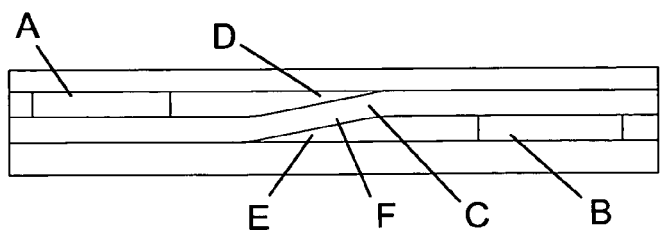
FIG. 21 is an enlarged view of the upper and lower tapered ends of the snap ring at their juncture with an intermediate ply of the snap ring.

In the same manner as in the form of invention of FIGS. 2 to 11, the form of FIGS. 14 to 16 is extremely compact with smaller cam members or balls 38, 39 which advance along the cam faces between the pressure plate 114 and cover 116 as hereinbefore described. As a result, minimum manual pressure is required on the hand lever 103 to retain the clutch plates 32 and 33 in the disengaged position notwithstanding higher speeds of rotation which would normally cause the cam members to advance outwardly and shift the pressure plate 114 to cause the clutch plates 32, 33 to move into the engaged position.

The control rod 102 extends through a transmission shaft 20 mounted in an inner hub 122 which is journaled by ball bearings 123 with respect to a lower end wall 124 of the housing 126. An important feature of the form of invention illustrated in FIGS. 15 to 21 resides in the mounting of the cover 116 with respect to side walls 128 of the housing 126. As best seen from FIG. 17, the housing 126 is generally basket-shaped having arcuate side walls or fingers 128 at equally spaced circumferential intervals which taper away from the base 124 into relatively thick free end portions 130. The free end portions 130 are provided with arcuate, circumferentially extending slots or grooves 132 which are aligned with one another for insertion of an endless snap ring 134, as shown in FIGS. 17 to 20, which extends around the inner wall surfaces of the housing walls 128.

In turn, the cover 116 is provided with cam faces in facing relation to the cam faces on the confronting surface of the pressure plate 114, and the pressure plate 114 is normally held away from the clutch plates 32, 33 by a series of compression springs 136 mounted on tubular posts 137 through which threaded fasteners 138 extend between the cover 116 and pressure plate 114. The spring tension of the springs 136 is regulated to resist radial outward movement of the balls as well as movement of the pressure plate 114 against the clutch plates 32, 34 until the clutch 100 reaches a predetermined rotational speed. Typically, a starter gear 140 on the housing 126 receives input power from a starter, not shown, to rotate the housing 126 and drive sprocket 142 which in turn rotates the crankshaft to start the engine.

As illustrated in FIGS. 1 to 14, it has been customary in the past to utilize threaded fasteners 45 to extend through aligned bores in the outer peripheral edge of the cover 25 and the spaced housing walls of the housing or basket 17. In accordance with this form of invention, it is proposed to greatly strengthen and simplify the interconnection between the cover 116 and housing 126 by forming the cover 116 with circumferentially spaced, radially outward flat projections or ears 144 which are complementary to the spaced walls 128. Thus, the intervening flat surface portions 146 between the radial projections 144 are dimensioned to axially advance along the inner arcuate surfaces of the free ends 130 of the housing to a point directly inside of the slots 132 for the snap ring 134 when the clutch housing is at rest. The snap ring 134 is then inserted into the aligned slots 132 and will bear firmly against the outer flat wall surfaces 145 and 146 of the cover 116. In this relation, the snap ring 134 will apply uniform resistance to any forces applied to the cover either by the override mechanism 100 or the balls 38, 39 when expanded under centrifugal force.

One form of snap ring is illustrated in FIGS. 17 to 20 and is manufactured and sold by Smalley Steel Ring Co. of Lake Zurich, Ill. The spring 134 is comprised of three layers or plies including upper and lower layers A and B with an intermediate layer C sandwiched therebetween. Layers A and B have oppositely directed tapered ends D and E which are superimposed upon a common angled portion F of the intermediate ply C so as to result in a snap ring of uniform thickness and strength virtually throughout. It will be apparent, however, that other snap rings or retaining rings may be employed including those of a single thickness having split ends which will permit radial contraction in order to slide, for example, along the inner surfaces of the free ends 130 into alignment with the slots 139 whereupon releasing the snap ring 134 it will expand or spring into the slots 132.

Detailed Description of Fourth Form of Invention

Figure 22:
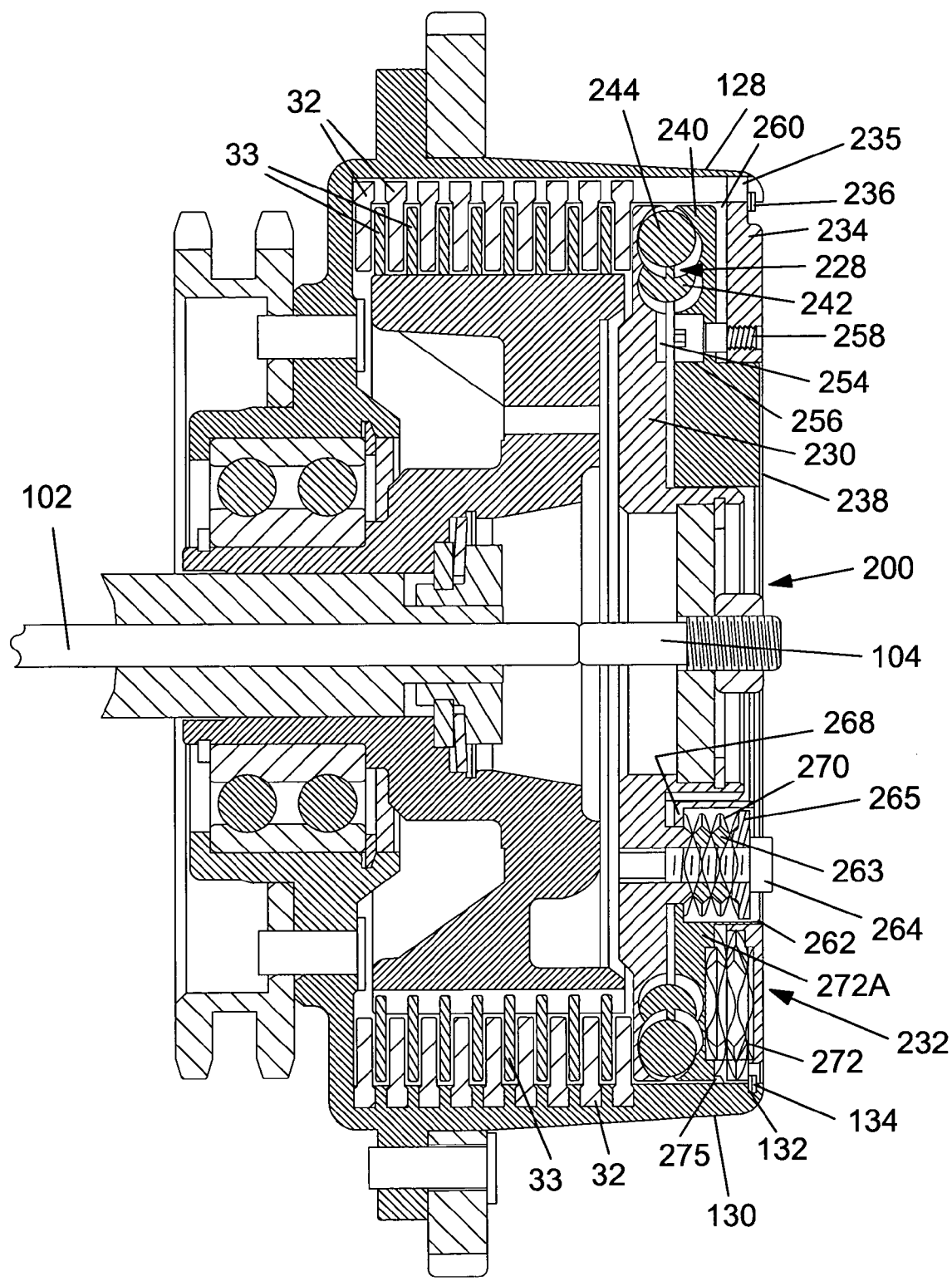
FIG. 22 is a sectional view of another embodiment of the present invention which incorporates the snap ring cover mount into a clutch housing having a pressure control mechanism.

There is illustrated in FIG. 22 a clutch 200 corresponding to the motorcycle clutch 101 illustrated in FIGS. 15 to 21 and accordingly like parts to those of FIGS. 15 to 21 are correspondingly enumerated. A cam-actuating mechanism 228 is mounted between a pressure plate 230 and cover 232. The cover 232 comprises an annular stationary wall portion 234 having an outer peripheral edge 235 affixed to the housing 128 by snap ring 134 in the same manner as described with reference to FIGS. 15 to 21 and specifically in such a way that the annular wall portion 234 is substantially flush with the free end 130 of the housing walls 128. In addition, the cover 232 includes an inner movable portion 238 and outer relatively thin retainer portion 240 which extends directly behind the annular cover portion 234.

The cam-actuating mechanism 228 is comprised of radially inner and outer rows of circumferentially spaced cam members 242 and 244 interposed between the pressure plate 230 and retainer portion 240 and is modified from that of the form of FIGS. 13 to 21 by utilizing only one row of cam faces in inner concentric relation to the outer rows of cam faces in the pressure plate 230 and cover portion 240.

A plurality of circumferentially spaced counterbores 254 are aligned with bores 256 in the cover portion 238 for insertion of threaded fasteners 258 between the cover portions 238 and 232 while leaving a clearance 260 between the cover portions. Thus, the cover portion 238 is axially displaceable with respect to the fasteners 258 to move through the clearance space 260 in response to increased spreading forces applied by the cams 242 and 244 after the clutch plates 32, 34 have moved into clutching engagement.

A second series of circumferentially spaced bores 262 are formed in the cover portion 240 and receive tubular posts 263 extending from the pressure plate 230 for insertion of threaded fasteners 264. A washer 265 is positioned at one end of each post 263 to receive a bolt 264. An annular shoulder 268 on each bore 262 is in opposed facing relation to shoulder 265 so that the shoulders 265 and 268 define end stops for a spring 270 mounted under compression therebetween. The springs 270 preload the balls 242, 244 under a predetermined amount of force to resist outward radial movement of the balls 242, 244 until the engine reaches a predetermined speed to impart sufficient centrifugal force to the balls for outward advancement along their respective cam faces. The springs 270 can be adjusted by shims as well as inward threading of each bolt 264 to vary the distance between the shoulders 265 and 268.

A series of spring pairs 272 and 272A are mounted around the cover portion in aligned bores or spring seats 275 in the cover portions 234 and 240. The springs 272, 272A are compressed as the pressure plate 230 and cover portion 234 are expanded to move the clutch plates 32, 33 into engagement.

The spring force of the springs 272, 272A is such as to resist spreading of the pressure plate 230 and cover portion 240 beyond a predetermined limit which is the maximum clamping force that can be safely exerted on the clutch plates 32, 33 to assure non-slipping engagement but will permit the plates 32, 33 to slip in the event that extreme shock loads are transmitted through the drive train.

In order to override the automatic clutch, the push rod 102 is operated by the override mechanism 100 and the leading end of the push rod is aligned with the threadedly adjustable stem 104. When the push rod 102 is advanced by the control lever 103, it will be operative through the mounting plate 110 to cause the entire cam-actuating mechanism to be displaced away from the clutch plates 32, 33, and at low speeds will cause the pressure plate 230 to be held away from the clutch plates 32, 33. At higher speeds, the push rod 102 can be engaged to release the clutch by moving the entire cam-actuating mechanism as an assembly away from the clutch plates 32, 33 by compressing the outer maximum pressure springs 272, 272A. This will of course exert even greater force on the cover 234 at its points of attachment to the free ends 130 of the housing walls 128.

In the same manner as illustrated in FIGS. 15 to 21, the cover portion 234 has radially outwardly projecting ears 235 which are complementary to the spaced walls 128 of the housing and is dimensioned to fit snugly inside of the side walls 128 at a position beneath the slots 132. The snap ring 134 is inserted into the aligned slots 132 to fit snugly against the outer flat wall surfaces of the cover so that the outer or exterior wall surface of the cover is substantially flush with the free ends 130 of the housing side walls.

In operation, the control rod 102 is operative in the same manner as described with reference to FIGS. 1 and 12 to 14 to regulate slippage between the clutch plates. An advantage in the form of invention shown in FIG. 2 is that the manual force required for the control rod 102 to disengage the clutch plates 32, 33 is reduced since the mounting plate 110 on the stem 104 will displace the entire cam-actuating mechanism away from the clutch plates 32 and 33, as opposed to manually squeezing the pressure plate to force the balls or cam members 38, 39 radially inwardly to relieve or release the pressure on the clutch plates 32, 33. It is therefore much easier for the operator to cause the clutch plates to slip as well as to disengage.

Although the forms of invention herein have been described for use in motorcycles, it will be appreciated that they are adaptable for use in other applications in which an automatic clutch is utilized, such as for example, drag racing, cars, trucks, tractors, go-carts, all-terrain vehicles, cement mixers and power tools that, depending upon the application, the different features of the forms of invention herein described may be utilized with a single row cam-actuating mechanism.

It is therefore to be understood that while preferred and modified forms of invention are herein set forth and described, the above and other modifications and changes may be made in the construction and arrangement of elements as well as intended use of the apparatus without departing from the spirit and scope thereof as defined by the appended claims and equivalents thereof.

We claim:

1. In a centrifugal clutch having a transmission shaft, a hub coupled to said shaft, a rotatable driven member in outer spaced concentric relation to said shaft, clutch members mounted for relative axial displacement into and out of engagement with one another between said hub and said shaft, and a pressure plate axially displaceable between a cover and an endmost of said clutch members including means biasing said pressure plate in an axial direction away from said clutch members, the improvement comprising:

at least one row of cam members interposed between said cover and said pressure plate wherein said cam members are movable radially outwardly under centrifugal force to cause said pressure plate to move in a direction causing said clutch members to move into clutching engagement with one another;

an elongated control rod extending centrally of said housing and being axially slidable with respect to said housing;

first means between one end of said control rod and said pressure plate being movable in response to axial movement of said control rod to displace said pressure plate in an axial direction independently of said biasing means; and second means for selectively advancing and retracting said control rod whereby to disengage said clutch members independently of said cam members.

2. In a centrifugal clutch according to claim 1 wherein said cam members are in the form of metal balls and means defined by cam faces arranged in at least one row on said cover in facing relation to said pressure plate for retaining said cam.

3. In a centrifugal clutch according to claim 2 wherein each of said cam faces includes a ramp inclining radially outwardly at an angle in the range of 30° to 50° in a direction toward said pressure plate.

4. In a centrifugal clutch according to claim 3 wherein said pressure plate includes a plurality of indented cam faces aligned with said cam faces in said cover to define complementary pairs of said cam faces between said pressure plate and said cover, each said complementary pair receiving one of said cam members therebetween.

5. In a centrifugal clutch according to claim 1 wherein said control rod is operative to lock said pressure plate against axial displacement thereby preventing said clutch members from moving into clutching engagement with one another.

6. In a centrifugal clutch according to claim 1 wherein said control rod is engageable with said pressure plate to control the degree of pressure exerted by said pressure plate against said clutch plates and thereby regulate slipping engagement as well as complete disengagement between said clutch plates.

7. In a centrifugal clutch according to claim 6 wherein a slide member is journaled with respect to said pressure plate and movable into engagement with said pressure plate in response to advancement of said control rod to retain said pressure plate against axial displacement toward said clutch members.

8. A centrifugal clutch comprising:

a housing;

a transmission shaft, a hub coupled to said shaft, a cover, a rotatable driven member in outer spaced concentric relation to said shaft, clutch members mounted for relative axial displacement into and out of engagement with one another between said hub and said housing, and a pressure plate axially displaceable between said cover;

a plurality of cam members interposed between said cover and said pressure plate wherein said cam members are movable radially outwardly under centrifugal force to cause said pressure plate to move in a direction causing said clutch members to move into clutching engagement with one another;

first means between said pressure plate and said cover for retaining said cam members in circumferentially spaced relation to one another whereby to undergo limited radial outward movement at low speeds of rotation to overcome said biasing means and move said clutch members into clutching engagement with one another; and second means including a control rod extending centrally of said housing and being axially slidable with respect to said housing, and third means between one end of said control rod and said pressure plate being movable in response to advancement of said control rod to move said pressure plate in a direction causing said clutch members to move out of clutching engagement independently of the speed of rotation of said clutch.

9. A centrifugal clutch according to claim 8 wherein said first means is defined by a plurality of indented cam faces arranged in a plurality of concentric rows on said cover in facing relation to said pressure plate.

10. A centrifugal clutch according to claim 9 wherein each of said cam faces includes a ramp inclining radially outwardly at an angle in the range of 30° to 50° in a direction toward said pressure plate.

11. A centrifugal clutch according to claim 10 wherein said pressure plate includes a plurality of indented cam faces aligned with said cam faces in said cover to define complementary pairs of said cam faces between said pressure plate and said cover, each said complementary pair receiving one of said cam members therebetween.

12. A centrifugal clutch according to claim 11 wherein said first means including said control rod are engageable with said pressure plate to regulate the amount of pressure exerted by said pressure plate on said clutch members independently of the speed of rotation of said clutch.

* * * * *

(12) EX PARTE REEXAMINATION CERTIFICATE (7886th)
United States Patent
Drussel et al.

(10) Number: US 7,140,480 C1
(45) Certificate Issued: *Nov. 23, 2010

(54) CENTRIFUGAL CLUTCH AND COVER MOUNT ASSEMBLY THEREFOR

(75) Inventors: Douglas W. Drussel, Sedalia, CO (US); George Michael Wilfley, Englewood, CO (US)

(73) Assignee: Drussel Wilfley Design, L.L.C., Denver, CO (US)

Reexamination Request:
No. 90/010,229, Jul. 25, 2008

Reexamination Certificate for:
Patent No.: 7,140,480
Issued: Nov. 28, 2006
Appl. No.: 10/863,680
Filed: Jun. 8, 2004

(*) Notice: This patent is subject to a terminal disclaimer.

Related U.S. Application Data

(63) Continuation-in-part of application No. 10/791,949, filed on Mar. 2, 2004, and a continuation-in-part of application No. 10/327,160, filed on Dec. 20, 2002, and a continuation-in-part of application No. 09/877,518, filed on Jun. 7, 2001, now Pat. No. 6,705,446.

(51) Int. Cl.
*F16D 19/00* (2006.01)
*B62M 9/00* (2006.01)

(52) U.S. Cl. ..................... 192/83; 192/105 B

(58) Field of Classification Search ............. 192/83, 192/105 B
See application file for complete search history.

(56) References Cited

U.S. PATENT DOCUMENTS

| 2,368,299 A | 1/1945 | Hayter |
| 3,939,734 A | 2/1976 | Blanchette |
| 4,550,817 A | 11/1985 | Euler |

OTHER PUBLICATIONS

Harley–Davidson, Clutch Assembly, Harley–Davidson 1999 Softail Service Manual, 1998, p. 6–9 Figure 6–17, Harley Davidson, USA.

*Primary Examiner*—Matthew C. Graham

(57) ABSTRACT

A clutch having a plurality of cam members between a cover and pressure plate to move outwardly under centrifugal force and cause the pressure plate to move axially to force a plurality of clutch plates into clutching engagement, a manual override mechanism to lock out the pressure plate to maintain the clutch plates in a disengaged position, and pressure limiting springs prevent shock loads from being imparted to the clutch plates when the plates are advanced into clutching engagement with one another. The clutch housing includes a cover which can be mounted either flush or inset in circumferentially spaced walls of the housing and held in place by a retaining ring inserted into slots in the side walls and is adaptable for use with any type of clutch with or without the manual override mechanism and pressure limiting springs.

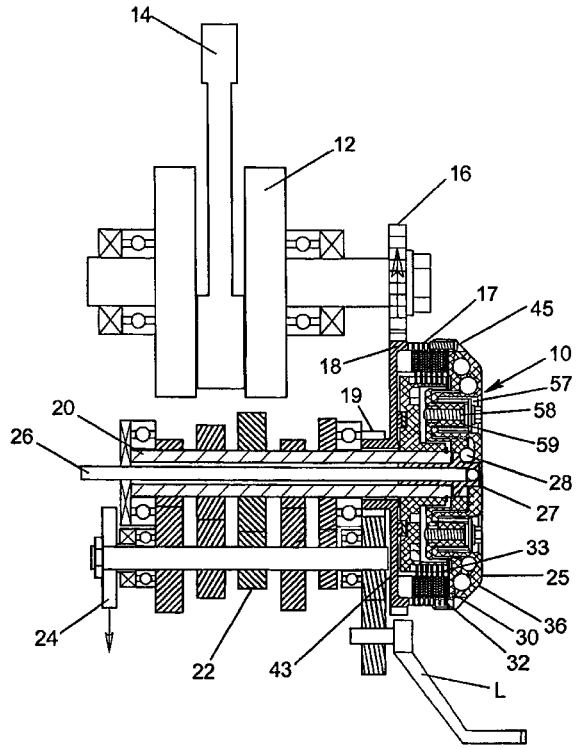

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1, 2, 7 and 8 are determined to be patentable as amended.

Claims 3-5 and 9-12, dependent on an amended claim, are determined to be patentable.

New claims 13-16 are added and determined to be patentable.

1. In a centrifugal clutch having a transmission shaft, a hub coupled to said shaft, a rotatable driven member in outer spaced concentric relation to said shaft, clutch members mounted for relative axial displacement into and out of engagement with one another between said hub and said [shaft] *rotatable driven member*, and a pressure plate axially displaceable between a cover and an endmost of said clutch members including means biasing said pressure plate in an axial direction away from said clutch members, the improvement comprising:

at least one row of cam members interposed between said cover and said pressure plate wherein said cam members are movable radially outwardly under centrifugal force to cause said pressure plate to move in a direction causing said clutch members to move into clutching engagement with one another;

an elongated control rod extending centrally of said housing and being axially slidable with respect to said housing;

first means between one end of said control rod and said pressure plate being movable in response to axial movement of said control rod to displace said pressure plate in an axial direction independently of said biasing means; and second means for selectively advancing and retracting said control rod whereby to disengage said clutch members independently of said cam members*; and*

*wherein said control rod is engageable with said pressure plate to control the degree of pressure exerted by said pressure plate against said clutch plates and thereby regulate slipping engagement as well as complete disengagement between said clutch plates.*

2. In a centrifugal clutch according to claim 1 wherein said cam members are in the form of metal balls and means defined by cam faces arranged in at least one row on said cover in facing relation to said pressure plate for retaining said cam *members*.

7. In a centrifugal clutch according to claim [6] *1* wherein a slide member is journaled with respect to said pressure plate and movable into engagement with said pressure plate in response to advancement of said control rod to retain said pressure plate against axial displacement toward said clutch members.

8. A centrifugal clutch comprising:

a housing;

a transmission shaft, a hub coupled to said shaft, a cover, a rotatable driven member in outer spaced concentric relation to said shaft, clutch members mounted for relative axial displacement into and out of engagement with one another between said hub and said housing, and a pressure plate axially displacable between said cover *and an endmost of said clutch members*;

a plurality of cam members interposed between said cover and said pressure plate wherein said cam members are movable radially outwardly under centrifugal force to cause said pressure plate to move in a direction causing said clutch members to move into clutching engagement with one another;

first means between said pressure plate and said cover for retaining said cam members in circumferentially spaced relation to one another whereby to undergo limited radial outward movement at low speeds of rotation to overcome said biasing means and move said clutch members into clutching engagement with one another; and second means including a control rod extending centrally of said housing and being axially slidable with respect to said housing, and third means [between] *for connecting* one end of said control rod [and] *to* said pressure plate being movable in response to advancement of said control rod to move said pressure plate in a direction causing said clutch members to move out of clutching engagement independently of the speed of rotation of said clutch.

13. *In a centrifugal clutch according to claim 1 wherein said biasing means enables slippage between said clutch members when shock loads are applied thereto.*

14. *A centrifugal clutch according to claim 8 including pressure control means between said pressure plate and said cover to prevent shock loads from being imparted to said clutch members when said clutch members are in clutching engagement with one another and enable slippage between said clutch members when shock loads are applied thereto.*

15. *A centrifugal clutch comprising:*

*a housing;*

*a transmission shaft, a hub coupled to said shaft, a cover, a rotatable driven member in outer spaced concentric relation to said shaft, clutch members mounted for relative axial displacement into and out of engagement with one another between said hub and said housing and a pressure plate axially displaced between said cover and an endmost of said clutch members including means for biasing said pressure plate away from said clutch members;*

*a plurality of cam members interposed between said cover and said pressure plate wherein said cam members are movable radially outwardly under centrifugal force to cause said pressure plate to move in a direction causing said clutch members to move into clutching engagement with one another;*

*first means between said pressure plate and said cover for retaining said cam members in circumferentially spaced relation to one another whereby to undergo limited radial outward movement at low speeds of rotation to overcome said biasing means and move said clutch members into clutching engagement with one another; and* second means including a control rod extending centrally of said housing and being axially slidable with respect to said housing, and third means for connecting one end of said control rod to said pressure plate being movable in response to advancement of said control rod to move said pressure plate in a direction causing said clutch members to move out of clutching engagement independently of the speed of rotation of said clutch.

16. A centrifugal clutch comprising:

a housing;

a transmission shaft, a hub coupled to said shaft, a cover, a rotatable driven member in outer spaced concentric relation to said shaft, clutch members mounted for relative axial displacement into and out of engagement with one another between said hub and said housing and a pressure plate axially displaced between said cover and an endmost of said clutch members including means for biasing said pressure plate away from said clutch members whereby to enable slippage between said clutch members when shock loads are applied thereto;

a plurality of cam members interposed between said cover and said pressure plate wherein said cam members are movable radially outwardly under centrifugal force to cause said pressure plate to move in a direction causing said clutch members to move into clutching engagement with one another;

first means between said pressure plate and said cover for retaining said cam members in circumferentially spaced relation to one another whereby to undergo limited radial outward movement at low speeds of rotation to overcome said biasing means and move said clutch members into clutching engagement with one another; and second means including a control rod extending centrally through said housing and being axially slidable with respect to said housing, and third means between one end of said control rod and said pressure plate being movable in response to advancement of said control rod to move said pressure plate in a direction causing said clutch members to move out of clutching engagement independently of the speed of rotation of said clutch.

* * * * *